(12) United States Patent
Raiko

(10) Patent No.: US 8,979,952 B2
(45) Date of Patent: Mar. 17, 2015

(54) METHOD FOR THE THERMAL TREATMENT OF BIOMASS IN CONNECTION WITH A BOILER PLANT

(75) Inventor: Markku Raiko, Hyvinkaa (FI)

(73) Assignee: Valmet Power Oy, Tampere (FI)

( * ) Notice: Subject to any disclaimer, the term of this patent is extended or adjusted under 35 U.S.C. 154(b) by 481 days.

(21) Appl. No.: 13/319,020

(22) PCT Filed: May 5, 2010

(86) PCT No.: PCT/FI2010/050363
§ 371 (c)(1),
(2), (4) Date: Nov. 28, 2011

(87) PCT Pub. No.: WO2010/128209
PCT Pub. Date: Nov. 11, 2010

(65) Prior Publication Data
US 2012/0060412 A1    Mar. 15, 2012

(30) Foreign Application Priority Data

May 8, 2009    (FI) ..................... 20090183

(51) Int. Cl.
*C10L 5/00* (2006.01)
*C10B 53/02* (2006.01)
(Continued)

(52) U.S. Cl.
CPC ............ *C10B 53/02* (2013.01); *C10B 49/02* (2013.01); *C10L 5/44* (2013.01); *C10L 9/083* (2013.01); *Y02E 50/10* (2013.01); *Y02E 50/14* (2013.01); *Y02E 50/15* (2013.01); *Y02E 50/30* (2013.01)
USPC ................... 44/550; 44/589; 44/590; 44/599; 44/605; 44/606

(58) Field of Classification Search
CPC ........... C10B 53/02; C10B 53/08; C10L 5/50; C10L 5/403; C10L 5/44; C10L 5/442; C10L 5/445; C10L 5/46; C10L 5/48; C10L 9/08; C10L 9/083; Y02E 50/10; Y02E 50/14; Y02E 50/15; Y02E 50/30
USPC ................... 44/550, 589, 590, 599, 605, 606
See application file for complete search history.

(56) References Cited

U.S. PATENT DOCUMENTS

| 1,858,972 A | 5/1932 | Snyder |
| 4,465,556 A | 8/1984 | Bowen et al. |
| 5,584,970 A | 12/1996 | Schmalfeld et al. |

(Continued)

FOREIGN PATENT DOCUMENTS

| DE | 3424491 A1 | 1/1985 |
| FI | 20075720 A | 4/2009 |

(Continued)

OTHER PUBLICATIONS

Extended European Search Report, dated May 12, 2014, for European Application No. 10772065.8.

*Primary Examiner* — Cephia D Toomer
(74) *Attorney, Agent, or Firm* — Birch, Stewart, Kolasch & Birch, LLP

(57) ABSTRACT

The invention relates to the improvement of the fuel-properties of biomass in an integrated manner to facilitate storage, shipping and applicability thereof. In the process, biomass (6) is thermally treated within a combustion process to cause partial torrefaction of the organic matter present in biomass, thus yielding components inert to biological decomposition processes. Constituents (10) separated in gaseous form are utilized as fuel, while the thermally treated biomass (8) remaining in the solid form is utilized in a separate process.

9 Claims, 2 Drawing Sheets

(51) Int. Cl.
*C10B 49/02* (2006.01)
*C10L 5/44* (2006.01)
*C10L 9/08* (2006.01)

(56) References Cited

U.S. PATENT DOCUMENTS 8,105,400 B2 * 1/2012 Bergman .................. 44/605

2003/0221363 A1 12/2003 Reed
2009/0193679 A1 8/2009 Guyomarc'h
2010/0266464 A1 10/2010 Sipila et al.

FOREIGN PATENT DOCUMENTS

| GB | 2 188 916 A | 10/1987 |
| WO | WO-2007078199 A1 | 7/2007 |
| WO | WO-2008000960 A2 | 1/2008 |

* cited by examiner

METHOD FOR THE THERMAL TREATMENT OF BIOMASS IN CONNECTION WITH A BOILER PLANT

This application is the National Phase Under 35 U.S.C. §371 of PCT International Application No. PCT/FI2010/050363 which has an International filing date of May 5, 2010, which claims priority to Finnish Application No. 20090183 filed on May 8, 2009. The entire contents of all applications listed above are hereby incorporated by reference.

FIELD OF THE INVENTION

The invention relates to a process for the thermal treatment of biomass in combination with a boiler plant.

BACKGROUND OF THE INVENTION

Global warming, or the so-called greenhouse effect, is caused by the increase of the carbon dioxide concentration in the atmosphere. One of the significant causes for the greenhouse effect is the energy production where burning of fossile fuels generates most of the carbon dioxide accumulating in the atmosphere and also in plants through photosynthesis, or in the so-called natural recycling processes.

Carbon dioxide concentration of the atmosphere is very low, only slightly above 0.3%. Binding of carbon dioxide directly from the atmosphere would for instance be possible with washing techniques, which, however, are not feasible due to the low partial pressure of carbon dioxide. In practice, the only way for carbon dioxide removal from the atmosphere is to apply solutions based on photosynthesis by plants. In photosynthesis, sugars ($C_6H_{12}O_6$) are generated by plants by means of solar radiation energy from the atmospheric carbon dioxide ($CO_2$) and water ($H_2O$) absorbed by the roots from the soil, and concomitantly, oxygen ($O_2$) is released into the atmosphere. From the sugars, plants produce, among others, cellulose for growing cellular walls and starch for storing energy. Moreover, various other organic substances such as fats and vitamins are produced by plants from the sugars and nutrients absorbed with water.

Fossile fuels (such as coal, crude oil, and natural gas) mainly consist of carbon and hydrocarbons. Most of the manmade carbon dioxide believed to contribute to the greenhouse effect is generated by burning of these fuels. Technologies are being developed, enabling the separation, at the power plant, of the carbon dioxide generated by this burning to give a separate substance stream that may be ultimately disposed of in a landfill. These alternatives include the recovery during gasification, solutions based on combustion with oxygen, and chemical washing of flue gasses. All these alternatives share the common feature that for the recovery, the production units should have high capacities and long operation times to make the recovery at least theoretically feasible considering the price levels in the present carbon dioxide trading (10-50 €/metric ton of carbon dioxide).

The term biomass refers to materials derived from living plants and generated by photosynthesis. Fuels derived therefrom are called biofuels. Bioenergy is energy from said biofuels. In Finland, biofuels are obtained from biomass growing in forests, wetlands and fields, as well as from municipal, agricultural and industrial organic wastes suitable for the production of energy. Bioenergy is one of the sources of renewable energy.

Use of bioenergy in the power production is considered to be neutral with respect to carbon dioxide emissions, and for this reason emissions therefrom are not part of the carbon dioxide trading. Carbon dioxide released during burning of biofuels is considered to be recycled to the atmosphere only via a different route than in conventional natural recycling during decomposition of the biomass.

Thermal treatment of biomass under mild conditions is called torrefaction (also known as the roasting process). This process is a thermochemical treatment normally carried out at atmospheric pressures and at temperatures of about 200-300° C. under oxygen-free conditions. During the process, water and additional volatile components present in the biomass are removed and biopolymers are partially decomposed to give volatile compounds. The final product consists of the remaining dry and solid material. Properties of the biomass for fuel application are significantly improved by the process.

The document EP 2017 325 A2 discloses an apparatus and process for decomposing organic plant material. The apparatus includes, among others, torrefaction and pyrolysis reactors. Torrefaction serves as the pretreatment stage of the organic plant material prior to pyrolysis. From the torrefaction, both the solid and gaseous materials are passed to pyrolysis. Heat is indirectly brought to the torrefaction reactor by heat conductors.

The document WO 2007/078199 A1 discloses a process and apparatus for the treatment of biomass in a torrefaction reactor comprising drying and torrefaction chambers, respectively. Both drying of biomass and torrefaction of the dried biomass are performed using hot gasses.

Technology of the torrefaction process and known processes are described by Aula Uslu in: Pre-Treatment Technologies and Their Effects on the International Bioenergy Supply Chain Logistics, Techno-economic evaluation of torrefaction, fast pyrolysis and pelletisation, Report Number: NWS-I-2005-27, December 2005.

Several torrefaction processes are already known that are, however, difficult to control and wherein the amount of biomass energy lost in the gaseous form is high.

OBJECT OF THE INVENTION

Based on the above presentation, there is a need for a process for improving the fuel-properties of biomass in an integrated manner to facilitate storage, shipping and applicability thereof.

DESCRIPTION OF THE INVENTION

The process of the invention is characterized by the combination of the thermal treatment of biomass and a boiler plant.

In the process of the invention, biomass is passed to a reactor for thermal treatment thereof under such conditions where the organic matter present in the biomass is at least partially torrefied to give components that are inert with respect to biological decomposition processes, said components being used as a fuel like coal. Components separated in a gaseous form are used as fuels.

Here, the term thermal treatment refers to a so-called roasting process, that is, a torrefaction process where the organic matter present in the biomass is at least partially, preferably totally torrefied to give components that are inert with respect to biological decomposition processes. In torrefaction, the proportion of hydrocarbons leaving the biomass is minimized, the goal being the elimination of the biological decomposition property of the biomass. Most of the components separated in gaseous form consist of water vapour and carbon monoxide (CO). Reaction heat is mainly used for moisture removal from the biomass, and part of the reactions proceed exothermically when the organic oxygen present in the biological components of the biomass, that is in lignin, hemicellulose and cellulose, reacts with hydrocarbons. The thermal treatment of the biomass is closer to drying than to pyrolysis.

Thermal treatment (heating) of the biomass is performed under conditions with low oxygen concentration, at temperatures of 150 to 500° C., preferably at atmospheric pressures and at temperatures of 180 to 350° C. By altering the temperature, the proportion of the thermally treated biomass remaining in the solid state may be adjusted, the proportion of the thermally treated biomass being lower at higher temperatures.

Biomass may contain wood, straw, peat and/or municipal, agricultural and industrial organic wastes suitable for energy production, or mixtures thereof, without wishing to be limited thereto. The process of the invention is not limited by the physical condition of the biomass. The biomass may also be initially wet at the beginning of the treatment.

The process may be applied to the use of biomass in dust-fired steam boilers. Thermally treated biomass may be passed to coal mills like coal without having to restrict the mixing ratio of the biomass to coal to about 10%. Without the thermal treatment, mixing of biomass in high amounts with coal is difficult due to the plasticity of the untreated biomass that decreases the friction necessary for the sufficient comminution of coal in the mill. The process is particularly very advantageous in case it is desirable to limit carbon dioxide emissions of existing power plants by increasing the proportion of biomass burned to significant levels.

Accordingly, the invention is directed to a novel way of improving the fuel-properties of biomass in an integrated manner, thus facilitating the storage, shipping and use of biomass. In the process, biomass is thermally treated within a boiler plant.

DESCRIPTION OF THE FIGURES

In the following, the invention is illustrated with reference to the appended figures presenting some embodiments of the invention. However, the intention is not to limit the invention to said embodiments according to these examples.

DETAILED DESCRIPTION OF THE INVENTION

Figure 1:
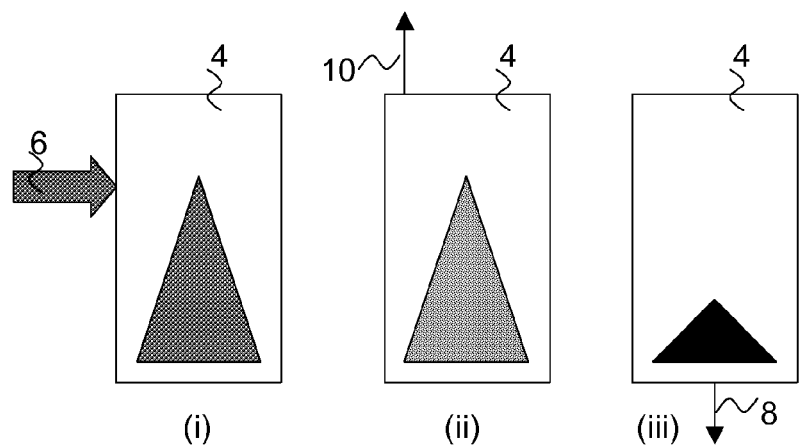
FIG. 1 shows the thermal treatment of biomass as a batch process.

FIG. 1 shows the principle of the three steps of the thermal treatment of biomass carried out as a batch process where the steps may be repeated in cycles in a batch-wise operated reactor 4. In the first step (i) of the process, biomass 6 is fed into the reactor 4. In the second step (ii), conditions required for the torrefaction of biomass 6 are provided in the reactor 4 by elevating the temperature and providing conditions with low oxygen concentration. During torrefaction of biomass, organic matter is decomposed by heat, thus producing gaseous reaction products 10 and thermally treated biomass 8. Gaseous reaction products 10 are removed from the reactor 4. In the third step (iii), torrefaction is completed and the thermally treated biomass 8 is cooled and passed to post-treatment.

Figure 2:
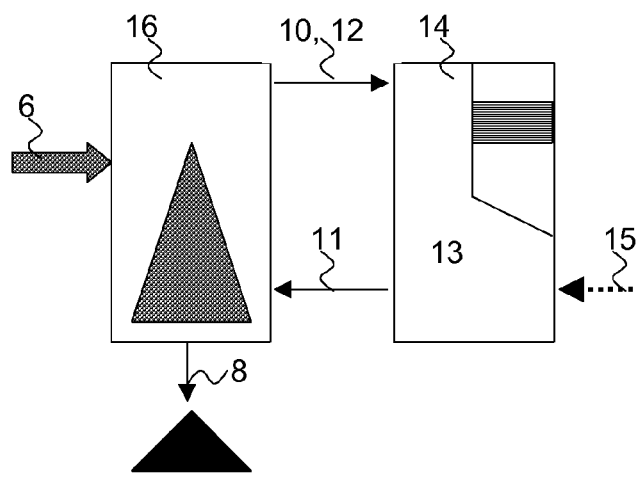
FIG. 2 shows the thermal treatment of biomass as a continuous process.

FIG. 2 shows the principle of a continuously operated process. Biomass 6 is fed into a reactor 16 at the upper part thereof, is passed downwards by gravitation, and the thermally treated biomass 8 leaves the reactor 16 at the lower part thereof. Hot flue gasses 11 from a combustion process 13 are passed into the reactor 16 to carry out the thermal treatment. Gaseous reaction products 10 generated in the torrefaction and flue gasses 12 used as the heat source leave the reactor at the upper part, and are passed to the combustion process 13. The combustion process 13 takes place in a boiler 14 for heat generation, said boiler also receiving additional fuel 15 in addition to the gaseous reaction products 10 generated in the reactor 16.

Figure 3:
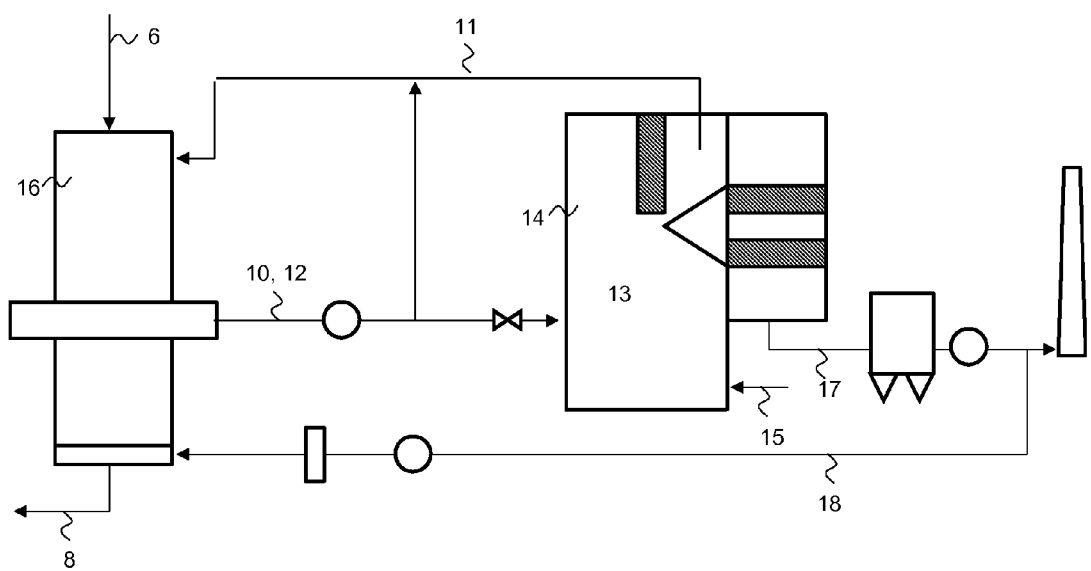
FIG. 3 shows the thermal treatment of biomass as a continuous co-current process.

FIG. 3 shows the principle of a preferable continuous process where flue gas at least partially, preferably totally, flows in the same direction as the biomass stream in the reactor. Biomass 6 is fed into the reactor 16 at the upper part thereof, is passed downwards by gravitation, and the thermally treated biomass 8 leaves the reactor 16 at the lower part thereof. Hot flue gasses 11 from the combustion process 13 are passed into the reactor 16 to carry out the thermal treatment. Gaseous reaction products 10 generated in the torrefaction and flue gasses 12 used as the heat source are passed to the combustion process 13. The combustion process 13 takes place in a boiler 14 for heat generation also receiving additional fuel 15 in addition to the gaseous reaction products 10 generated in the reactor 16. Alternatively, at least part of the gaseous reaction products 10 and flue gasses 12 may be recycled to the reactor 16 together with the hot flue gasses 11. As a further alternative, also part of hot flue gasses 17 generated in the combustion process 13 may be passed after cooling to the reactor 16 as cooling gasses 18. Methods known in the art may be used for cooling of the hot flue gasses 17.

The continuously operated reactor 16 is preferably a fixed-bed reactor where biomass 6 is fed into the hopper at the top thereof, and is moved downwards by gravitation, the thermally treated biomass 8 leaving the hopper at the bottom. In the reactor, flue gas at least partially, preferably totally, flows in the same direction as the biomass stream. Several advantages are obtained by this operation. Conventional fuel hopper and transportation means thereof may be utilized as the torrefaction reactor. Moreover, it is possible to keep effluent gasses clean since the biomass layer to be treated acts as a dust separator of the downward flow, capturing and binding even very fine particles firmly to the heavy biomass bed, thus preventing them from being entrained out of the reactor by the leaving gas stream.

An advantage of this co-current operation is also the fact that overheating of the biomass is avoided since the unreacted and generally in this stage still undusty biomass first meets the hottest gas in the upper part of the hopper. In the lower part of the hopper, the gas has already cooled down and reached the temperature of the biomass to be treated, thus avoiding local overheated spots also after the completion of drying and torrefaction reactions that bind heat. Owing to the co-current operation, the temperatures of the gas leaving the torrefaction reactor, and that of the biomass to be treated are the equal at the exit, and thus the processing temperature and heating power of the reactor may be adjusted by measuring the temperature of the leaving gas, thus preventing overheating. The process is more readily controllable than solutions of the prior art, and owing to the controllability of the process, the amount of energy leaving the biomass in gaseous form is lower than that in the processes of the prior art. Weight loss of the particles is about 5% at the temperature of 250° C., whereas for counter-current reactors, the particles are heated to the temperature of the gas entering the reactor, for instance to 350° C., already causing a weight loss of 20 to 25%. In case the temperature of the gas entering a counter-current reactor is limited, the amount of gas and accordingly the size of the reactor must be increased.

Gasses generated during torrefaction of biomass contain constituents condensed by cooling of the gasses. Gasses leaving the counter-current reactor are generated at temperatures higher than those of the gasses leaving the reactor, said gasses being thus more contaminating that those leaving the co-current reactor.

No more than 20%, preferably no more than 10% of the energy content of the fuel to be used in the combustion process 13 carried out in the boiler 14 is derived from the gaseous reaction products 10 generated in the reactor 4, 16. In one embodiment of the invention, thermally treated biomass 8 in the reactor 4, 16 is used as an additional fuel 15 in the boiler 14.

Thus, hot flue gasses 11 having temperatures between 300 and 800° C., preferably 300 and 500° C., obtained from a power plant boiler 14, preferably from a dust-fired burning boiler, and passed to the reactor 16 are used for torrefaction. Flue gasses are preferable heat sources for torrefaction since the oxygen content thereof is low and they will not cause any combustion reactions in the torrefaction step. Combustible gasses 10 generated by the torrefaction are mixed with the flue gas stream 12 passing through the reactor. These gasses are passed in the form of a mixture to and utilized as the fuel of a combustion process 13 to produce the thermal energy necessary for the torrefaction. Alternatively, at least part of the gaseous reaction products 10 and flue gasses 12 may be recycled to the reactor 16 together with hot flue gasses 11. In an alternative embodiment, temperatures of the hot flue gasses 11 are lowered by passing cooling gasses to the same line prior to the passage thereof into the reactor 16.

In one embodiment of the invention, the operation of the torrefaction reactor 4, 16 comprises a separate drying cycle where the biomass 6 is dried prior to torrefaction. Said drying may be performed in the same reactor construct than the torrefaction itself, or alternatively separated from the torrefaction process, using heated air, flue gasses or recycled gas as drying gasses, said recycled gas being heated with a heat exchanger. The temperature for drying is lower than that for torrefaction, typically between about 40 and 100° C. Due to lower temperatures, drying gasses may contain higher amounts of oxygen without increasing the ignition risk of the fuel. For the drying cycle, the moisture content of the biomass used as the starting material is initially between about 40 and 70%, the moisture content being between about 0 and 20% at the end of the drying cycle. Drying times vary between 30 minutes and 10 hours, for instance depending on the coarseness of the biomass, drying temperature and procedure used.

In one embodiment of the invention, the thermally treated biomass obtained as the product of the torrefaction process is preferably compacted to give pellets, brickets or any other suitably formed bodies by using well-known methods and apparatuses of the art. Higher energy density is attained by compacting the thermally treated biomass, thus converting it into a more competitive fuel having lower shipping costs. Also the hydrophobic properties of the thermally treated biomass are improved by compacting, thus for instance improving the storage stability thereof.

Various modifications of the invention are possible within the scope defined by the following claims.

The invention claimed is:

1. A process for the thermal treatment of biomass in connection with a boiler plant, comprising the steps of
    feeding biomass to a torrefaction reactor where the biomass is heated to a temperature between 180 and 350° C. under conditions with low oxygen concentration, thus causing at least partial torrefaction of organic matter present in the biomass to produce components which are inert with respect to biological decomposition processes, said thermal treatment thus resulting in gaseous reaction products and torrefied biomass,
    passing the gaseous reaction products generated by the thermal treatment from the torrefaction reactor to a power plant boiler, and
    passing hot flue gas from the power plant boiler to the torrefaction reactor to carry out the thermal treatment,
wherein more than 80% of the energy content of the fuel burned in the power plant boiler originates from a main fuel other than gaseous reaction products generated in the torrefaction reactor, and
    the heat treatment of the biomass is performed in a continuous torrefaction reactor, in which
    the flue gas stream flows at least partially in the same direction as the biomass.

2. The process according to claim 1, wherein the torrefaction reactor is a fixed bed reactor.

3. The process according to claim 1, wherein the flue gas stream is arranged to flow totally in the same direction as the biomass stream in the torrefaction reactor.

4. The process according to claim 1, wherein the temperature of the hot flue gas passed into the torrefaction reactor is between 300 and 500° C.

5. The process according to claim 1, wherein a conventional fuel hopper and transportation means thereof are utilized as the torrefaction reactor.

6. The process according to claim 1, wherein torrefied biomass produced in the torrefaction reactor is used as an additional fuel in the power plant boiler.

7. The process according to claim 1, wherein the power plant boiler is a pulverized fuel boiler.

8. The process according to claim 1, wherein the torrefied biomass is compacted to produce pellets, brickets or other products suitable for fuel.

9. The process according to any one of claims 1-8, wherein more than 90% of the fuel burned in the power plant boiler is fuel other than gaseous reaction products generated in the torrefaction reactor.

* * * * *